US012053040B2

(12) United States Patent
Bagwell et al.

(10) Patent No.: US 12,053,040 B2
(45) Date of Patent: Aug. 6, 2024

(54) DISPOSABLE RESPIRATOR

(71) Applicant: Kimberly-Clark Worldwide, Inc., Neenah, WI (US)

(72) Inventors: Alison S. Bagwell, Alpharetta, GA (US); David J. McNamara, Cumming, GA (US)

( * ) Notice: Subject to any disclaimer, the term of this patent is extended or adjusted under 35 U.S.C. 154(b) by 0 days.

(21) Appl. No.: 17/928,575

(22) PCT Filed: May 28, 2021

(86) PCT No.: PCT/US2021/035017

§ 371 (c)(1),
(2) Date: Nov. 29, 2022

(87) PCT Pub. No.: WO2021/243302

PCT Pub. Date: Dec. 2, 2021

(65) Prior Publication Data

US 2023/0232917 A1 Jul. 27, 2023

Related U.S. Application Data

(60) Provisional application No. 63/031,602, filed on May 29, 2020.

(51) Int. Cl.
*A41D 13/11* (2006.01)
*A62B 23/02* (2006.01)

(52) U.S. Cl.
CPC ........ *A41D 13/1161* (2013.01); *A62B 23/025* (2013.01)

(58) Field of Classification Search
CPC .................................................. A41D 13/1161
See application file for complete search history.

(56) References Cited

U.S. PATENT DOCUMENTS 4,419,993 A 12/1983 Petersen
D287,649 S 1/1987 Zdrok et al.
(Continued)

FOREIGN PATENT DOCUMENTS

CN 300730966 D 1/2008
CN 306651566 S 6/2021
(Continued)

OTHER PUBLICATIONS

Halyard, "Masks & Respirators—Facial & Respiratory Protection—Infection Prevention", Jun. 18, 2020, https://products.halyardhealth.com/infection-prevention/facial-respiratory-protection/masks-respirators.html#frp_type_958.

*Primary Examiner* — Zachary M Davis
(74) *Attorney, Agent, or Firm* — Moser Taboada

(57) ABSTRACT

Methods, systems and apparatus for a pouch-style mask having upper and lower mask substrates, each having a first layer comprising spunbond material and a second layer comprising meltblown material, a perimeter comprising a user contacting portion and a non-user contacting portion, and a shoulder proximate a left-side transition between the user contacting portion and the non-user contacting portion and a shoulder proximate a right-side transition between the user contacting portion and the non-user contacting portion. The mask also has a head strap assembly comprising first and second head straps each having first and second end portions, where the first end portions of the first and second head straps are attached to the left upper and lower shoulders in a side-by-side configuration and the second end portions of the first and second head straps are attached to the right upper and lower shoulders in a side-by-side configuration.

1 Claim, 8 Drawing Sheets

(56) References Cited

U.S. PATENT DOCUMENTS

| | | | | | |
|---|---|---|---|---|---|
| D347,713 | S | | 6/1994 | Brunson | |
| 5,322,061 | A | * | 6/1994 | Brunson ............ | A41D 13/1184 128/206.13 |
| D390,652 | S | | 2/1998 | Parker | |
| 6,070,579 | A | * | 6/2000 | Bryant ............... | A41D 13/1161 128/207.11 |
| 9,868,002 | B2 | | 1/2018 | Duffy | |
| 10,966,473 | B1 | | 4/2021 | Clary et al. | |
| 11,213,080 | B2 | | 1/2022 | Henderson | |
| D949,328 | S | | 4/2022 | Boyé | |
| 2010/0154805 | A1 | | 6/2010 | Duffy et al. | |
| 2011/0067700 | A1 | | 3/2011 | Spoo et al. | |
| 2014/0182599 | A1 | | 7/2014 | Duffy | |
| 2014/0182600 | A1 | | 7/2014 | Duffy | |
| 2014/0182601 | A1 | | 7/2014 | Duffy | |

FOREIGN PATENT DOCUMENTS

| | | | |
|---|---|---|---|
| DE | 4020212019640001 | S | 7/2021 |
| EM | 0016674110001 | S | 3/2010 |
| EM | 0082867510001 | S | 12/2020 |
| EP | 0606686 | A1 | 7/1994 |
| GB | 6195939 | S | 3/2022 |
| WO | 2004002251 | A1 | 1/2004 |
| WO | 2009022248 | A2 | 2/2009 |

* cited by examiner

DISPOSABLE RESPIRATOR

This application claims priority to and benefit of U.S. Patent Application Ser. No. 63/031,602, filed on 29 May 2020, entitled Disposable Respirator, the entire contents of which are herein incorporated by reference.

This disclosure relates to disposable and limited-use respirators and masks.

BACKGROUND

Respirators as used in a variety of manufacturing, industrial, custodial, academic, and household applications. In these applications, respirators filter out various particles and other contaminates to prevent or reduce the likelihood of such particles and contaminates from being inhaled by the mask wearer. Respirators have also found utility in the healthcare industry. In this regard, respirators are helpful in that they may be configured to filter exhaled air from the user to minimize the amount of contaminants released from the user into the environment, which could potentially affect patients having compromised immune systems, e.g., making them susceptible to infection and other illnesses.

For many current respirators the elastic bands/straps that secure the respirator to the wearer are difficult to place correctly over the head and frequently slide, roll, slip out of place, and/or are uncomfortable, and wide headbands that address some of the issues can be difficult to manufacture.

SUMMARY

In general, the subject matter of this specification relates to disposable and limited-use respirators.

In general, one aspect of the subject matter described in this specification can be implemented in a pouch-style mask comprising a upper mask substrate comprising a first layer comprising spunbond material and a second layer comprising meltblown material and having an upper perimeter comprising a user contacting portion and a non-user contacting portion, and wherein the upper perimeter has a left upper shoulder proximate a left-side transition between the user contacting portion and the non-user contacting portion and a right upper shoulder proximate a right-side transition between the user contacting portion and the non-user contacting portion; a lower mask substrate comprising a first layer comprising spunbond material and a second layer comprising meltblown material and having a lower perimeter comprising a user contacting portion and a non-user contacting portion, and wherein the lower perimeter has a left lower shoulder proximate a left-side transition between the user contacting portion and the non-user contacting portion and a right lower shoulder proximate a right-side transition between the user contacting portion and the non-user contacting portion, and wherein at least portions of the non-user contacting portion of the upper perimeter and the non-user contacting portion of the lower perimeter are attached; a head strap assembly comprising a first head strap having first and second end portions and a second head strap having first and second end portions, and wherein the first end portions of the first and second head straps are attached to the left upper and lower shoulders in a side-by-side configuration between the upper and lower mask substrates, the second end portions of the first and second head straps are attached to the right upper and lower shoulders in a side-by-side configuration between the upper and lower mask substrates; and wherein each of the first and second head straps have a stretch along their length of at least 150% of their unstretched length and, when stretched to this stretched length, recover more than seventy-five percent of the stretched length when the stretch tension is removed. Other embodiments of this aspect include corresponding methods and apparatus.

Yet another aspect of the subject matter described in this specification can be implemented in a pouch-style mask comprising a upper mask substrate comprising a first layer comprising spunbond material and a second layer comprising meltblown material and having an upper perimeter comprising a user contacting portion and a non-user contacting portion, and wherein the upper perimeter has a left upper shoulder proximate a left-side transition between the user contacting portion and the non-user contacting portion and a right upper shoulder proximate a right-side transition between the user contacting portion and the non-user contacting portion; a lower mask substrate comprising a first layer comprising spunbond material and a second layer comprising meltblown material and having a lower perimeter comprising a user contacting portion and a non-user contacting portion, and wherein the lower perimeter has a left lower shoulder proximate a left-side transition between the user contacting portion and the non-user contacting portion and a right lower shoulder proximate a right-side transition between the user contacting portion and the non-user contacting portion, and wherein at least portions of the non-user contacting portion of the upper perimeter and the non-user contacting portion of the lower perimeter are attached; a head strap assembly comprising a first head strap having first and second end portions and a second head strap having first and second end portions, and wherein the first end portions of the first and second head straps are attached to the left upper and lower shoulders in a side-by-side configuration between the upper and lower mask substrates, the second end portions of the first and second head straps are attached to the right upper and lower shoulders in a side-by-side configuration between the upper and lower mask substrates, and wherein each of the first end portions of the first and second head straps and second end portions of the first and second head straps have a width of between 0.4 and 1 inch. Other embodiments of this aspect include corresponding manufacturing methods and apparatus.

Particular embodiments of the subject matter described in this specification can be implemented so as to realize one or more of the following advantages. For example, the head straps of the respirator can be made wide and comfortable without compromising the difficulty of manufacturing the respirator as the straps are attached to the mask body in a side-by-side configuration (as opposed to a stacked configuration which presents high-speed manufacturing attachment issues for high bulk/thick straps). Further, the head straps can be made from a material that has significant stretch to allow the mask to fit more users (e.g., with various head sizes) and significant retraction to ensure the mask can be donned and doffed multiple times without the head straps losing their ability to snuggly hold the respirator to the wearer's face.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The present disclosure generally relates to disposable respirators and masks. More specifically, the disclosure relates to a pouch-style disposable respirator that offers increased comfort and manufacturability. To this end, the respirator includes head straps that stretch along their length to at least 150% of their unstretched length and, when stretched to this stretched length, retract more than seventy-five percent of the stretched length when the stretch tension is removed. The head straps are also wide (e.g., each about at least 0.5 inches wide) to distribute the pressure applied by the head straps on the wearer across a large area. In combination, these wide head straps with high stretch and recovery/retract properties provides a very comfortable and secure wearing experience.

Given these head straps often have a high basis weight than conventional straps, and in light of their larger width, these head straps are attached to the body of the respirator in a side-by-side configuration such that the portions of each head strap attached to the body do not overlap (or minimally overlap). This helps avoid the manufacturing challenges associated with trying to attach the bulky, thick, and/or high basis weight materials of the head straps in an overlapping, stacked configuration to the mask body, which can result in poor attachment of the straps to the body. This disposable respirator is described in more detail below with reference to FIGS. 1 and 2A, 2B.

Figure 1:
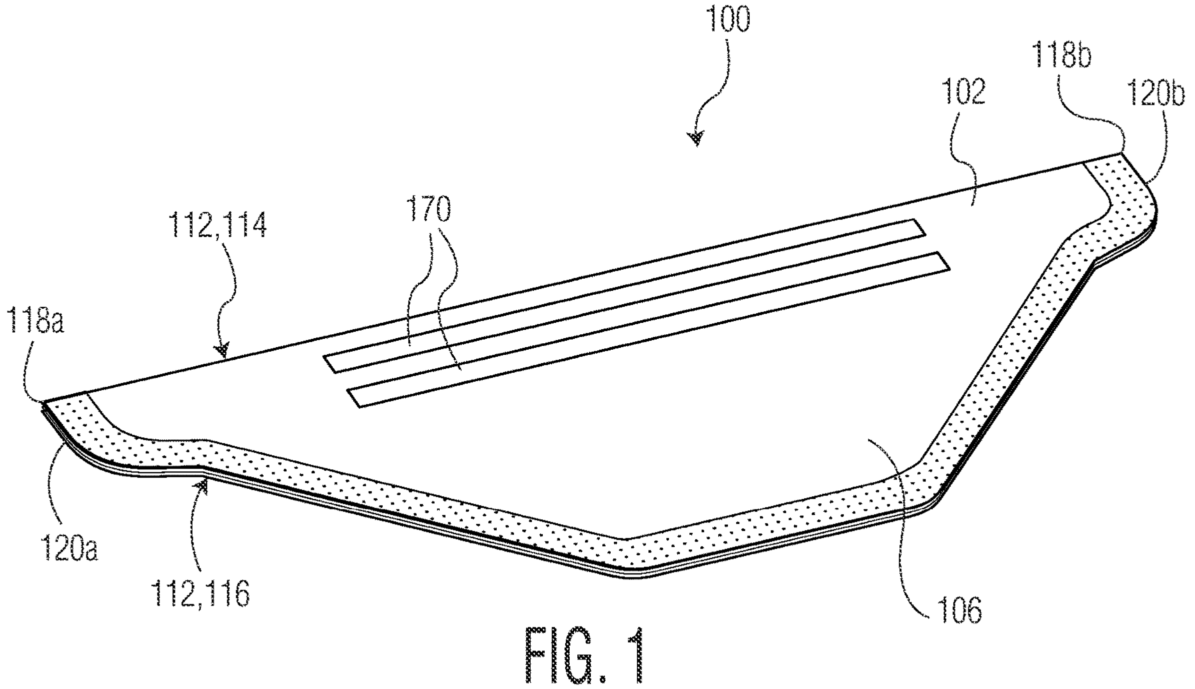
FIG. 1 is a perspective representation of an example respirator in a storage or shipping configuration.
Figure 2A:
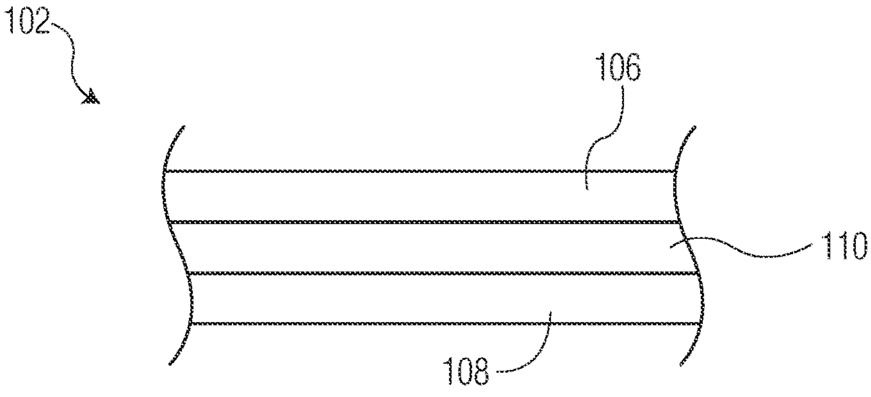
FIG. 2A is a cross-sectional view of the upper mask substrate of the mask substrate of FIG. 1.
Figure 2B:
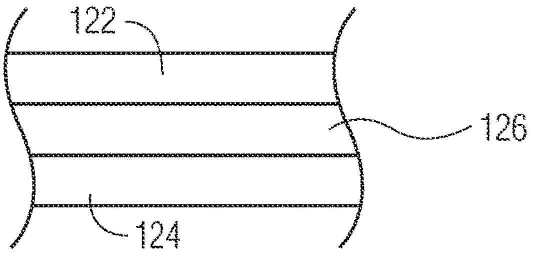
FIG. 2B is a cross-sectional view of the lower mask substrate of the mask substrate of FIG. 1.

FIG. 1 is a perspective representation of an example respirator 100 in a storage or shipping configuration, and FIG. 2A is a cutaway, cross-sectional view of the upper mask substrate of the respirator 100; and FIG. 2B is a cutaway, cross-sectional view of the lower mask substrate of the respirator 100. In some implementations the respirator 100 is a disposable, pouch-style respirator or mask (for convenience, mask and respirator will be used interchangeably herein). Disposable refers to respirators that are designed to be discarded after a limited use rather than being stored for continued and/or prolonged reuse.

Figure 10:
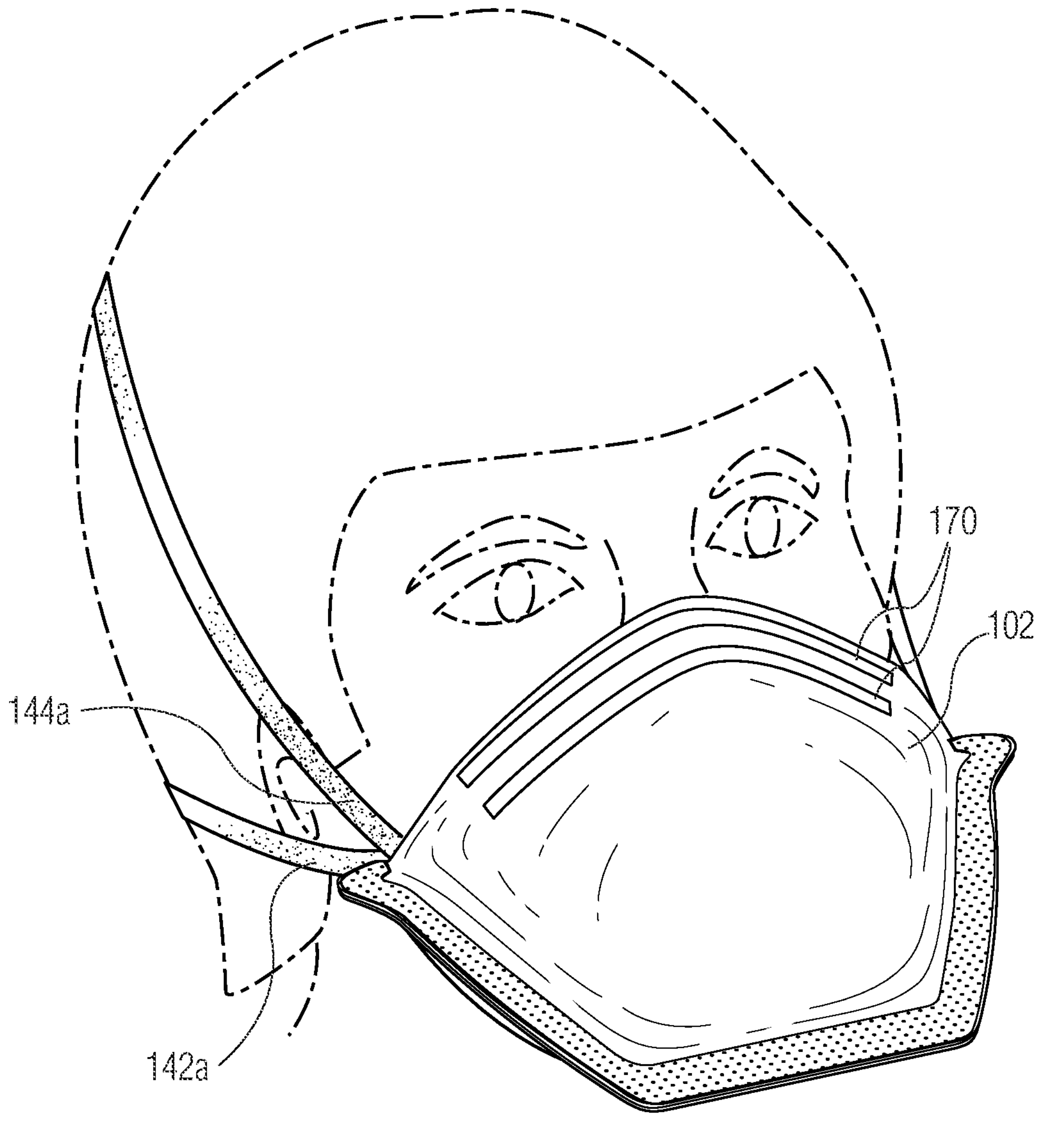
FIG. 10 is perspective-view representation of the example respirator of FIG. 9.
Figure 11:
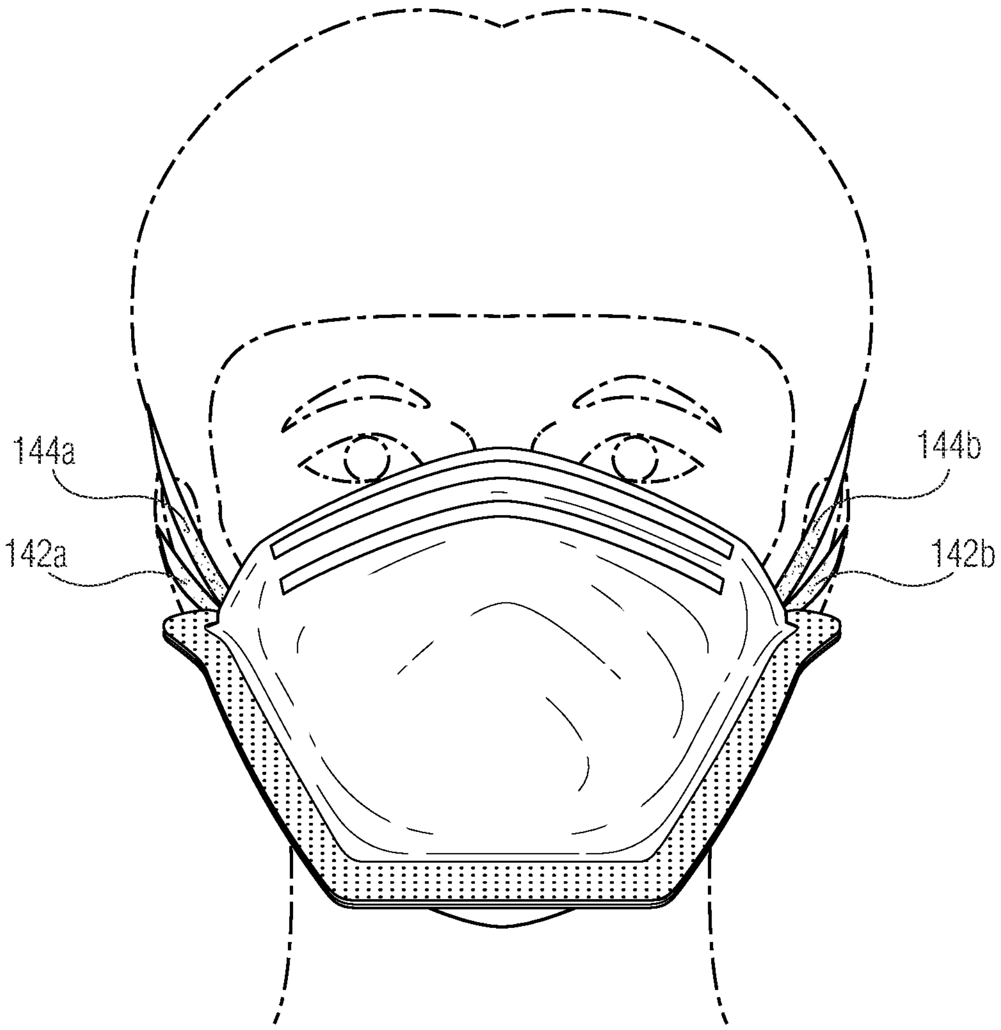
FIG. 11 is front-view representation of an example respirator of FIG. 9.
Figure 12:
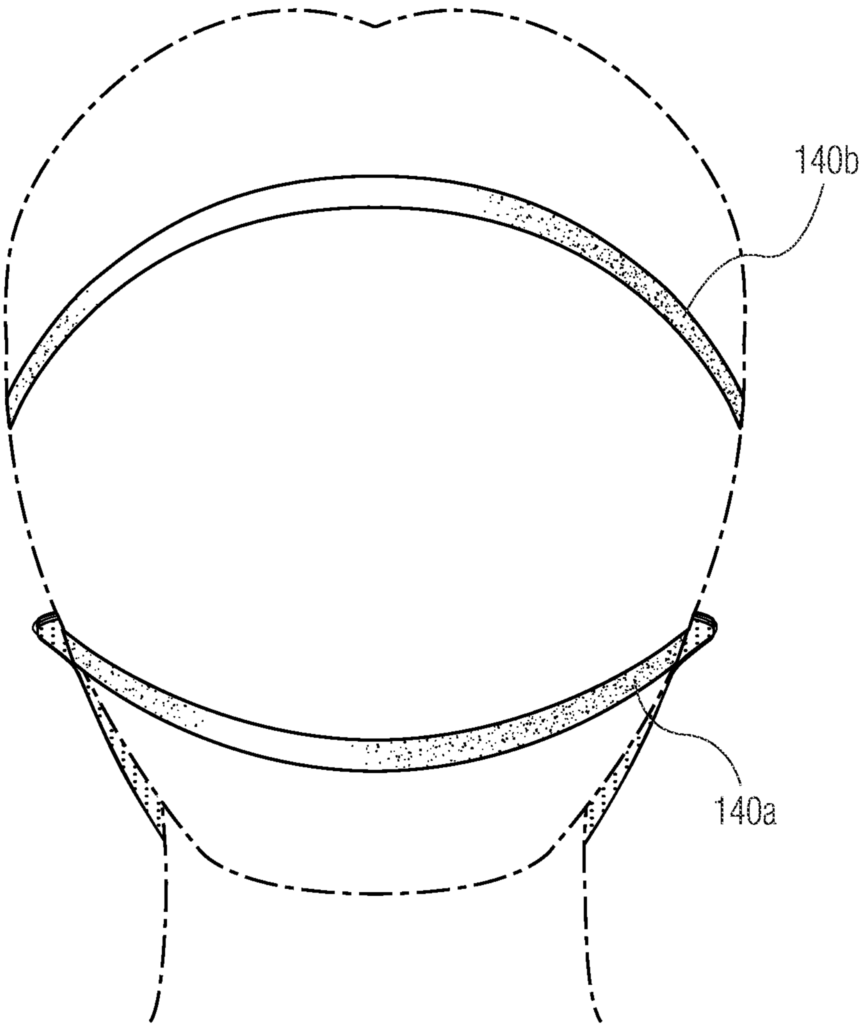
FIG. 12 is back-view representation of an example respirator of FIG. 9.

Pouch-style refers to a type of respirator that is designed to create a breathing chamber (e.g., an open-air space) around the wearer's nose and/or mouth such that a portion of the mask is not in intimate contact or directly adjacent to the wearer's nose and/or mouth to increase comfort while also being able to fold flat or near flat in a storage or shipping configuration. This is contrasted to, for example, a pleated type respirator that does not create a breathing chamber and a dome-type/cup-type respirator that does not fold flat. For clarity, the storage or shipping configuration indicates the respirator 100 is folded flat and not in an expanded configuration to form the air chamber (also referred to as a pouch). The respirator 100 is shown in a shipping configuration, for example, in FIG. 1 and in an expanded configuration, for example, in FIG. 10, which is perspective-view representation of the respirator 100, FIG. 11, which is front-view representation of the respirator 100, and FIG. 12, which is back-view representation of the respirator 100.

Figure 9:
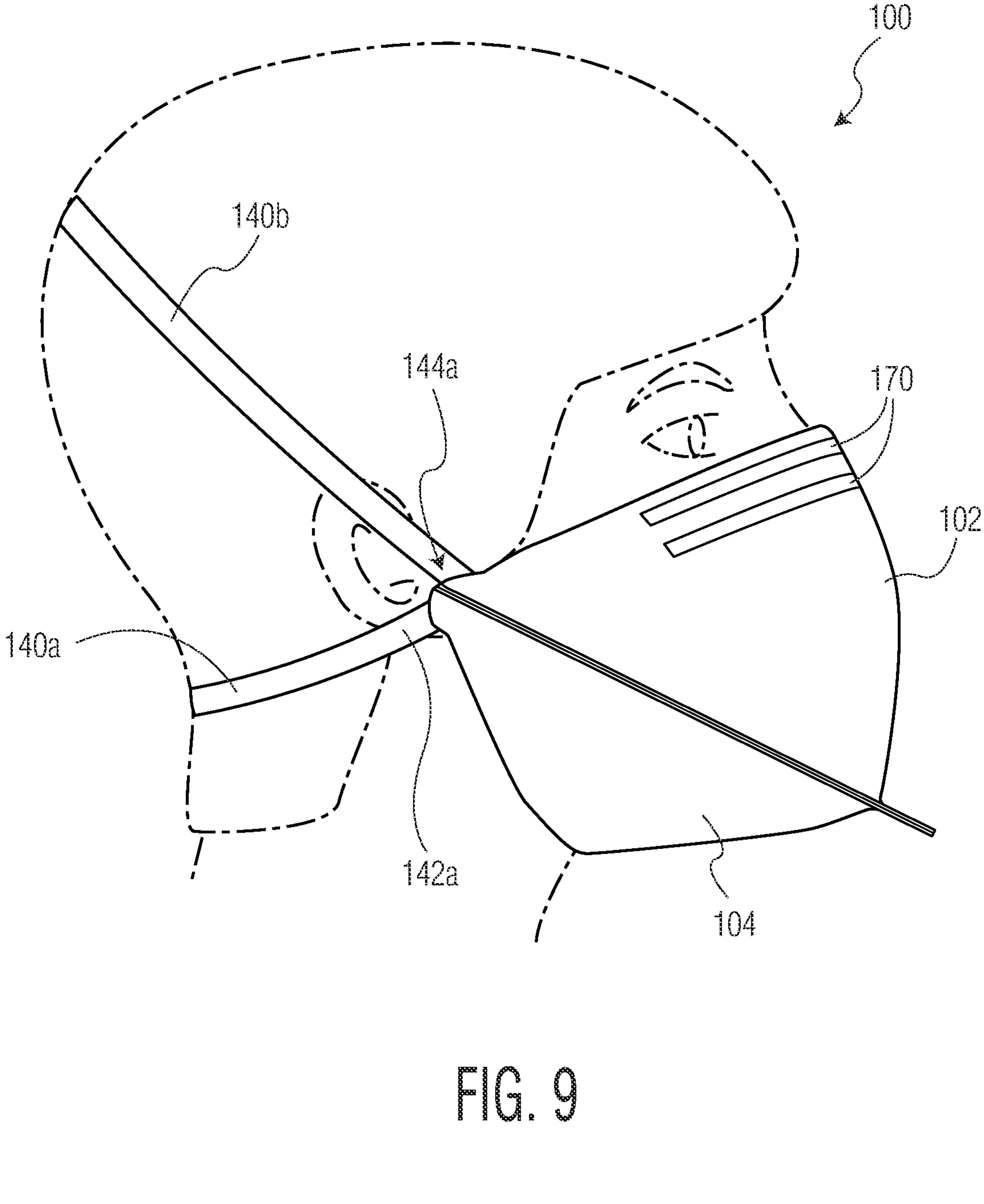
FIG. 9 is side-view representation of the respirator of FIG. 1 in use on a wearer.

The respirator 100 has an upper mask substrate 102 forming the top portion of the respirator 100 (and the top of the air chamber when the respirator 100 is in an expanded configuration as shown in, for example, FIG. 9, which is a side-view representation of the respirator 100 in use on a wearer) and a lower mask substrate 104 forming the bottom portion of the respirator 100 (and the bottom of the air chamber when the respirator 100 is in an expanded configuration).

In some implementations, the upper mask substrate 102 includes a first layer 106 comprising (i.e., made partially or entirely of) spunbond material or, for example, a multilayered laminate such as a spunbond/meltblown/spunbond laminate. Spunbond material refers to small diameter fibers which are formed by extruding molten thermoplastic material as filaments from a plurality of fine capillaries of a spinneret with the diameter of the extruded filaments then being rapidly reduced to fibers as described, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and/or U.S. Pat. No. 3,542,615 to Dobo et al. Spunbond fibers are generally continuous and have diameters generally greater than about 7 microns, more particularly, between about 10 and about 20 microns.

The upper mask substrate 102 also includes a second layer 108 comprising (i.e., made partially or entirely of) meltblown material. Meltblown material generally refers to fibers formed by extruding a molten thermoplastic material through a plurality of fine, usually circular, die capillaries as molten threads or filaments into converging high velocity gas (e.g., air) streams, generally heated, which attenuate the filaments of molten thermoplastic material to reduce their diameters. Thereafter, the meltblown fibers are carried by the high velocity gas stream and are deposited on a collecting surface or support to form a web of randomly dispersed meltblown fibers. Such a process is disclosed, for example, in U.S. Pat. No. 3,849,241 to Butin et al. Meltblowing processes can be used to make fibers of various dimensions, including macrofibers (with average diameters from about 40 to about 100 microns), textile-type fibers (with average diameters between about 10 and 40 microns), and microfibers (with average diameters less than about 10 microns). Meltblowing processes are particularly suited to making microfibers, including ultra-fine microfibers (with an average diameter of about 3 microns or less). A description of an exemplary process of making ultra-fine microfibers may be found in, for example, U.S. Pat. No. 5,213,881 to Timmons, et al. Meltblown fibers may be continuous or discontinuous and are generally self bonding when deposited onto a collecting surface.

In some implementations the second layer 108 includes two layers of a (stacked or one-on-top-of-the-other configuration) meltblown non-woven material. However, other known filter layers/material can also be used. A nonwoven material refers to materials and webs of material that are formed without the aid of a textile weaving or knitting process. For example, nonwoven materials, fabrics or webs have been formed from many processes such as, for example, meltblowing processes, spunbonding processes, air laying processes, coform processes, and bonded carded web processes.

The layers of the upper mask substrate 102 (as well as those of the lower mask substrate 104) can be, for example, made from one or more polymers having a softening temperature that is higher than the temperature used during a bonding step. In this manner, the polymers do not substantially soften during bonding to such an extent that the fibers become completely melt flowable. Example polymers include polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid, polyhydroxyalkanoates; copolymers thereof; and so forth. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

In some implementations, the first layer 106 functions as the external facing layer (i.e., the layer forming part of the exterior of the respirator 100) and the second layer 108 (or portions of the second layer 108 such as the meltblown material portion) functions as the media or filter layer with a primary purpose to prevent unwanted contaminates from entering the air chamber and being inhaled by the wearer. One way to increase the effectiveness of the second layer 108 at preventing such contamination or capturing such contaminates before entering the breathing chamber is through electret treating or hydro-charging (e.g., as described in U.S. Pat. No. 5,280,406 to Coufal et al.)

Electret treating refers to a treatment that imparts a charge to a dielectric material, such as a polyolefin. The charge includes layers of positive or negative charges trapped at or near the surface of the polymer, or charge clouds stored in the bulk of the polymer. The charge also includes polarization charges which are frozen in alignment of the dipoles of the molecules. Methods of subjecting a material to electret treating are well known by those skilled in the art. These methods include, for example, thermal, liquid-contact, electron beam, and corona discharge methods. One particular technique of subjecting a material to electret treating is disclosed in U.S. Pat. No. 5,401,466. This technique involves subjecting a material (such as the meltblown material of the second layer 108) to a pair of electrical fields with opposite polarities to apply charge to the material.

In some implementations, the upper mask substrate 102 includes a third layer 110 made from spunbond material (e.g., the same as the spunbond material of the first layer 106) or, for example, a multilayered laminate such as a spunbond/meltblown/spunbond laminate. However, other known facing layers/material can also be used. In these configurations the first and third layers 106 and 110 sandwich the middle second layer 108, as shown in FIG. 2A.

The upper mask substrate 102 has an upper perimeter 112 defining the edge of the upper mask substrate 102. The upper perimeter 112 includes a user contacting portion 114 and a non-user contacting portion 116. The user contacting portion 114 is the edge of the upper perimeter 112 that touches or is proximate to the wearer's face when the respirator 100 is worn. The non-user contacting portion 116 is the remaining edge of the upper perimeter 112 (e.g., that does not touch the wearer). The user contacting portion 114 and the non-user contacting portion 116 are joined at left- and right-side transition points 118.

In some implementations the layers (e.g., 106, 108, 110) of the upper mask substrate 102 are attached to one another through ultrasonic welding along (proximate) all or a portion of the non-user contacting portion 116 and, optionally, all or a portion of the user contacting portion 114. The layers can also or alternatively be attached to one another through adhesives and/or thermal bonding, e.g., along (proximate) all or a portion of the non-user contacting portion 116 and, optionally, all or a portion of the user contacting portion 114.

The upper perimeter has a right upper shoulder 120*a* proximate the right-side transition 118*a* between the user contacting portion 114 and the non-user contacting portion 116 and a left upper shoulder 120*b* proximate the left-side transition 118*b* between the user contacting portion 114 and the non-user contacting portion 116.

In some implementations, similar to the upper mask substrate 102, the lower mask substrate 104 includes a first layer 122 comprising (i.e., made partially or entirely of) spunbond material (and externally facing) or, for example, a multilayered laminate such as a spunbond/meltblown/spunbond laminate, and a second layer 124 comprising (i.e., made partially or entirely of) meltblown material. In some implementations the second layer 124 includes two layers of a (stacked or one-on-top-of-the-other configuration) meltblown non-woven material. However, other known filter layers/material can also be used.

Figure 4:
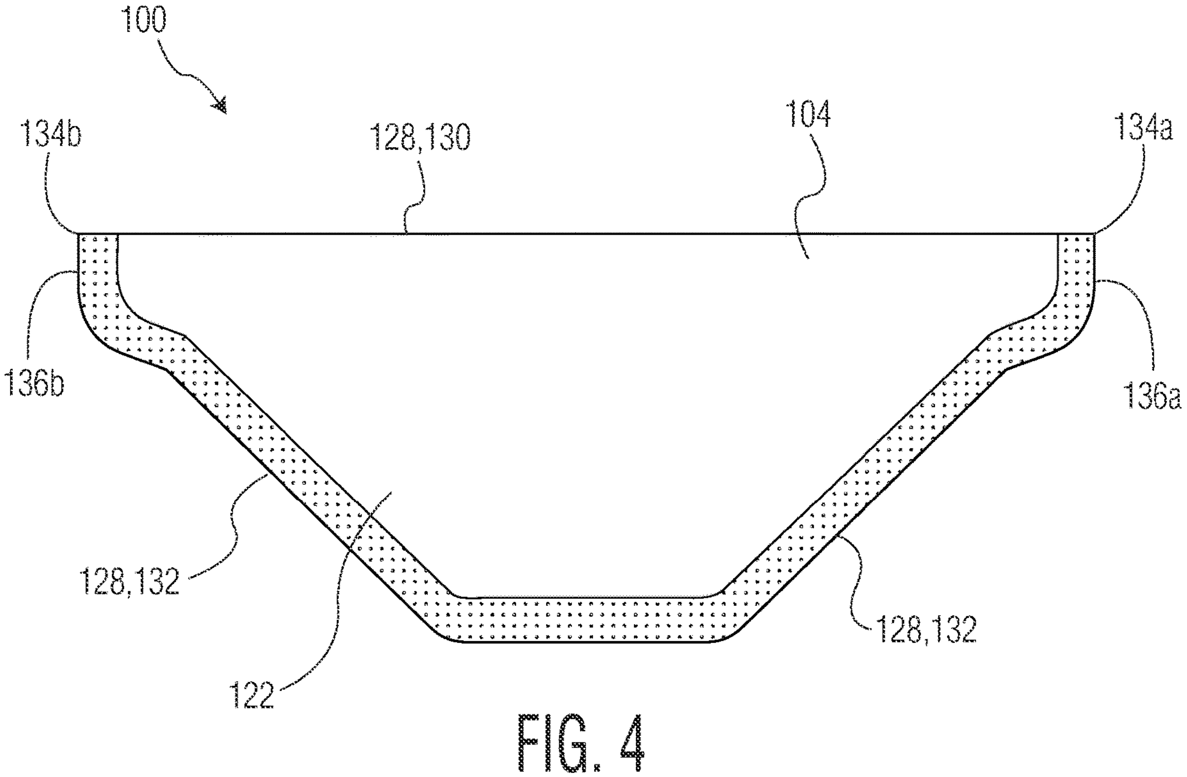
FIG. 4 is a bottom-view representation of the example respirator of FIG. 1.

Similar to the first layer 106 of the upper mask substrate 102, the first layer 122 of the lower mask substrate 104 functions as the external facing layer (i.e., the layer forming part of the exterior of the respirator 100) as shown in FIG. 4, which is a bottom-view representation of the example respirator 100 of FIG. 1. The second layer 124 (or portions of the second layer 124 such as the meltblown material portion) functions as the media or filter layer with a primary purpose to prevent unwanted contaminates from entering the air chamber (from the lower mask substrate 104) and being inhaled by the wearer. As described above one way to increase the effectiveness of the second layer 124 at preventing such contamination or capturing such contaminates before entering the breathing chamber is through electret treating or hydro-charging.

In some implementations, the lower mask substrate 104 includes a third layer 126 made from spunbond material (e.g., the same as the spunbond material of the first layer 122) or, for example, a multilayered laminate such as a spunbond/meltblown/spunbond laminate. However, other known facing layers/material can also be used. In these configurations the first and third layers 122 and 126 sandwich the middle second layer 124, as shown in FIG. 2B.

The lower mask substrate 104 has a lower perimeter 128 defining the edge of the lower mask substrate 104. The lower perimeter 128 includes a user contacting portion 130 and a non-user contacting portion 132. The user contacting portion 130 is the edge of the lower perimeter 128 that touches or is proximate to the wearer's face when the respirator 100 is worn. The non-user contacting portion 132 is the remaining edge of the lower perimeter 128 (e.g., that does not touch the wearer). The user contacting portion 130 and the non-user contacting portion 132 are joined at left- and right-side transition points 134.

In some implementations the layers (e.g., 122, 124, 126) of the lower mask substrate 104 are attached to one another through ultrasonic welding along (proximate) all or a portion of the non-user contacting portion 132 and, optionally, all or a portion of the user contacting portion 130. The layers can also or alternatively be attached to one another through adhesives and/or thermal bonding, e.g., along (proximate) all or a portion of the non-user contacting portion 132 and, optionally, all or a portion of the user contacting portion 130.

The lower perimeter 128 has a right lower shoulder **136*a* proximate the right-side transition 134*a* between the user contacting portion 130 and the non-user contacting portion 132 and a left lower shoulder 136*b* proximate the left-side transition 134*b* between the user contacting portion 130 and the non-user contacting portion 132**.

In some implementations all of or portions of the non-user contacting portion 116 of the upper perimeter 112 and the non-user contacting portion 132 of the lower perimeter 128 are attached, for example, by ultrasonic welding, adhesives, and/or thermal bonding or the like. Such attachment of the upper mask substrate 102 and lower mask substrate 104 to each other may occur concurrently during the attachment of layers 106 and 108 (and optionally 110) to each other and/or layers 122 and 124 (and optionally 126) to each other. Or, in some implementations, the layers 106 and 108 (optionally 110) are attached to each other and layers 122 and 124 (and optionally 126) are attached to each other in a first set of steps and then the upper mask substrate 102 and lower mask substrate 104 are separately attached to each other in a further step.

Figure 5:
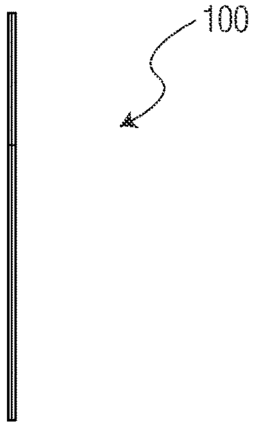
FIG. 5 is a side-view representation of the example respirator of FIG. 1.
Figure 6:
FIG. 6 is a back-view representation of the example respirator of FIG. 1.
Figure 7:
FIG. 7 is a front-view representation of the example respirator of FIG. 1.

Additional views of the respirator 100 in a shipping configuration are shown in FIG. 5, which is a side-view representation of the respirator 100, FIG. 6, which is a back-view representation of the respirator 100, and FIG. 7, which is a front-view representation of the respirator 100.

Figure 8:
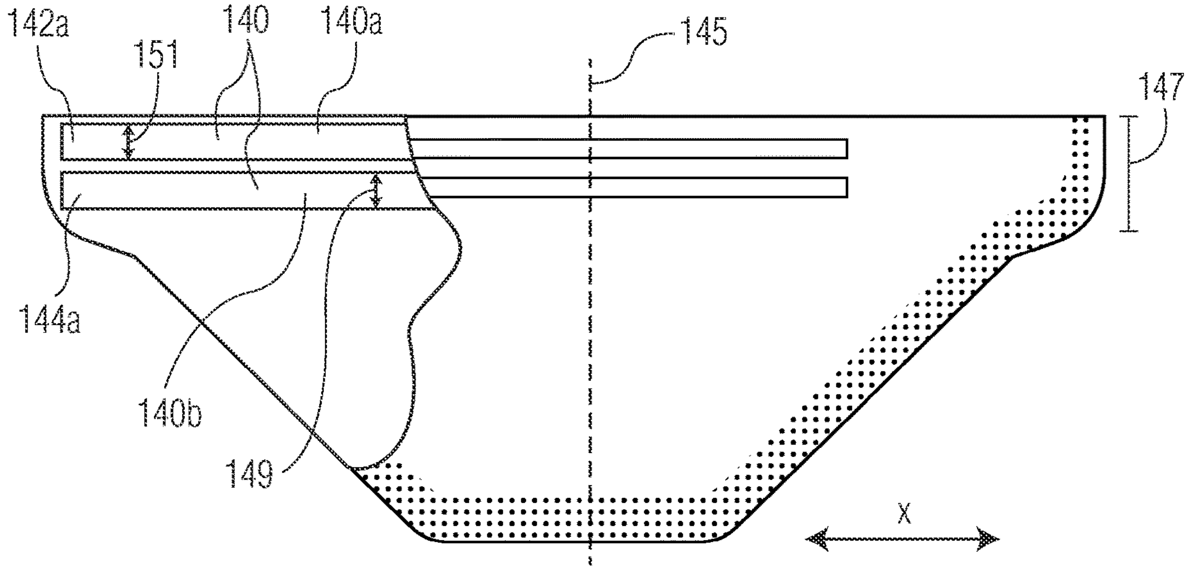
FIG. 8 is a cutaway detail view of the head straps of FIG. 1.

The respirator 100 also includes a head strap assembly 140, as shown in FIG. 8, which is a cutaway detail view of the head strap assembly 140 in which a portion of the upper mask substrate 102 has been removed to show the head strap assembly 140. The head strap assembly 140 serves to help position and hold the respirator 100 (e.g., snuggly) to the face of the wearer. For example, the head strap assembly includes a flexible material to have a retraction force suitable to provide a sufficiently tight seal to hold the mask to the wearer's head, while still allowing a comfortable fit while worn. In some implementations the head strap assembly 140 includes a first head strap **140*a* having first and second end portions 142*a*, *b* and a second head strap 140*b* having first and second end portions 144*a*, *b*. The end portions 142*b* and 144*b* are not shown in FIG. 8 but are mirror images of end portions 142*a* and 144*a* about line 145. In some implementations the straps 140*a*, *b* have the same or substantially the same (e.g., within ten or five percent) length along the X-axis (as shown in FIG. 8**).

The first head strap **140*a* and the second head strap 140*b* can be, for example, positioned in a side-by-side configuration (e.g., as shown in the storage configuration) between the upper 102 and lower 104 mask substrates such that both the first head strap 140*a* and the second head strap 140*b* lying flat in a same plane with the side of the first strap 140*a* furthest from the wearer's face adjacent to the side of the second strap 140*b* closest to the wearer's face. In some implementations there is a slight space (e.g., less than 0.5 inches) between the straps 140*a*, *b*. However, in other implementations the straps 140*a*, *b*** are immediately adjacent to each other with no space between them (without overlapping each other).

In either case, avoiding overlapping the straps **140*a*, *b* such that there are no portions of the straps 140*a*, *b* stacked on top of one another in a z direction (e.g., shown in FIG. 7) in the areas of the straps 140*a*, *b* to be attached facilitates attaching the straps 140*a*, *b* between and to the upper mask substrate 102, the lower mask substrate 104 or both. For example, the process to attach the straps 140*a*, *b* to one or both of the upper mask substrate 102 and the lower mask substrate 104 is made more difficult by increasing the thickness of the material that must be attached together. So if the two straps 140*a*, *b* are vertically stacked then the attachment process is more challenging, which can result in more costly manufacturing processes to accomplish the attachment or having a head strap assembly 140 that is less reliable/more prone to detach from one or both of the upper mask substrate 102 and the lower mask substrate 104** (depending on how the assembly is attached in the first place).

The head straps **140*a* and 140*b* can each have, for example, a width (149, 151) about at least 0.5 inches wide, e.g., along a majority of their length. In some implementations, the head straps 140*a* and 140*b* can each have a width (149, 151) between 0.25 to 1.5 inches, 0.25 to 1 inch, 0.5 to 1.5 inches, 0.5 to 1.25 inches, or 0.75 to 1.25 inches. Generally, wider straps 140*a*, *b* distributes the force of the straps 140*a*, *b*** across a wider area of the back of the wearer's head, resulting in less pressure and greater comfort.

In some implementations, the first end portions **142*a*, 144*a* of the first and second head straps 140*a*, *b* are attached to the right upper 120*b* and right lower 136*a* shoulders and the second end portions 142*b*, 144*b* of the first and second head straps are attached to the left upper 120*b* and left lower 136*b* shoulders. The shoulders 120, 136 can each have a width 147 that is about (e.g., within twenty-five, twenty, fifteen, ten, five percent or the same as) the width 149 of the first strap 140*a* combined with the width 151 of the second strap 140*b***.

To promote comfort and the ability to accommodate different wearer face sizes and shapes, the head straps **140*a*, *b* each stretch along their length (in the X-axis depicted in FIG. 8) of at least 150% of their unstretched length and, when stretched to this stretched length, recover more than seventy-five percent of the stretched length when the stretch tension is removed. Unstretched length refers to the length of a head strap (e.g., 140*a* or 140*b*) when in a relaxed or untensioned state, i.e., without any external tensioning or biasing force applied. Stretched length refers to the length of a head strap (e.g., 140*a* or 140*b***) when in a stretched or tensioned state, i.e., with an external tensioning or biasing force applied to elongate the length of the head strap along the X-axis. An example material with these types of characteristics is described in U.S. Pat. No. 5,385,775 issued Jan. 31, 1995 to Wright; U.S. Pat. No. 6,057,024 issued May 2, 2000 to Mleziva et al.; and U.S. Pat. No. 6,969,441 issued Nov. 29, 2005 to Welch et al., all of which are hereby incorporated by reference.

Stretch refers to the ability of a material to extend upon application of a biasing force. Percent stretch is the difference between the initial dimension of a material and that same dimension after the material has been stretched or extended following the application of a biasing force. Percent stretch may be expressed as [(stretched length−initial sample length)/initial sample length]×100. For example, if a material having an initial length of one (1) inch is stretched 0.50 inch, that is, to an extended length of 1.50 inches, the material can be said to have a stretch of 50 percent.

Recover refers to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would have a stretched length that is 150 percent of its relaxed length. If this stretched material contracted, that is recovered to a length of one and one tenth (1.1) inches after release of the biasing and stretching force, the material would have recovered 80 percent (0.4 inch) of its elongation.

Figure 3:
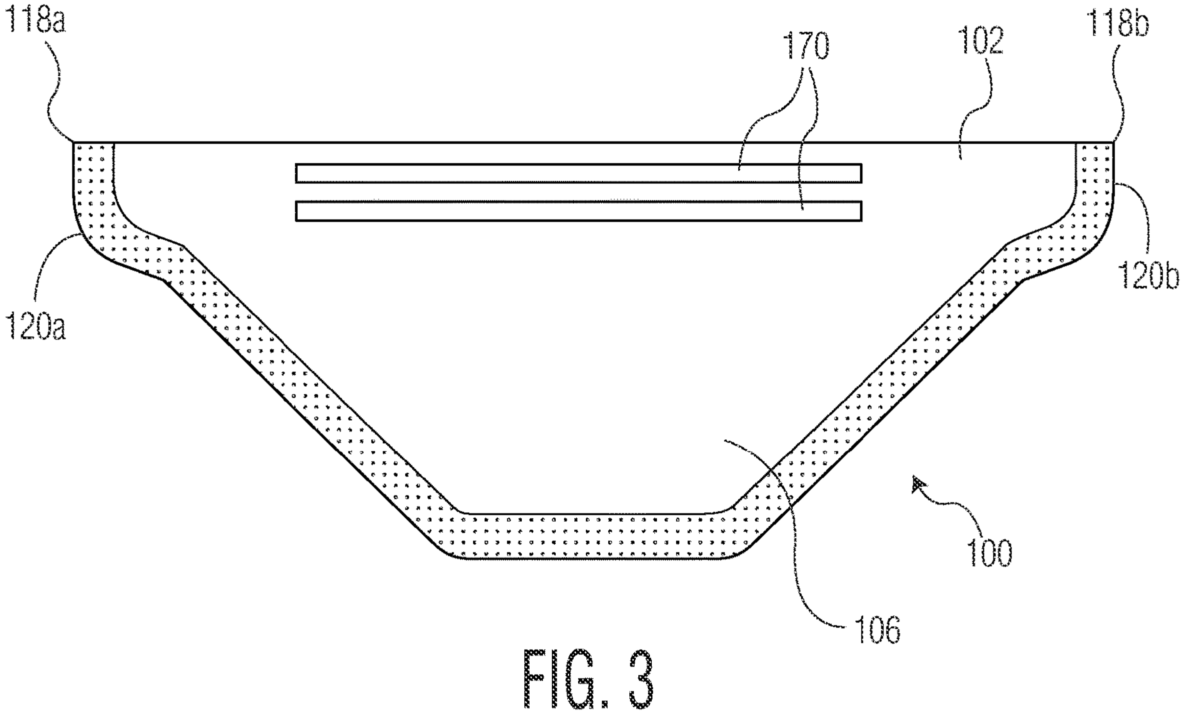
FIG. 3 is a top view representation of the example respirator of FIG. 1.

In some implementations the respirator 100 includes a nosepiece 170, as shown in FIG. 3, which is a top view representation of the example respirator 100 of FIG. 1. The nosepiece can be made from, for example, a malleable material (e.g., one, two or three metallic wires or strips) that allows a wearer to deform the nosepiece 170 to match the contours of the wearer's nose (and proximate facial areas) and retain that deformed shape to better fit the wearer.

In some implementations the nosepiece 170 is attached to an exterior of the first layer of the upper mask substrate 102 (as shown in FIG. 1), where the exterior of the first layer of the upper mask substrate is externally facing. In such implementations the nosepiece 170 can be attached to the exterior of the upper mask substrate 102 through, for example, adhesives and the like. In other implementations, the nosepiece 170 is attached between the first 106 and second layers 108 of the upper mask substrate 102. In these implementations, the nosepiece 170 can be contained in pocket in between the layers, for example, formed by bonding the first 106 and second layers 108 together along the perimeter of the nosepiece 170, or the nosepiece 170 can be attached to one or both of the first 106 and second layers 108 through adhesives or the like.

In some implementations the materials and/or thicknesses of the upper 102 and lower mask substrates 104 can be selected to give the respirator 100 a desired particle filtration efficiency, for example, of 95%. Particle filtration efficiency of 95% means that the respirator 100 filters at least 95% of (airborne) particles (e.g., 0.3 micron size particles) from passing through the respirator 100.

EMBODIMENTS

Embodiment 1. A pouch-style mask comprising a upper mask substrate comprising a first layer comprising spunbond material and a second layer comprising meltblown material and having an upper perimeter comprising a user contacting portion and a non-user contacting portion, and wherein the upper perimeter has a left upper shoulder proximate a left-side transition between the user contacting portion and the non-user contacting portion and a right upper shoulder proximate a right-side transition between the user contacting portion and the non-user contacting portion; a lower mask substrate comprising a first layer comprising spunbond material and a second layer comprising meltblown material and having a lower perimeter comprising a user contacting portion and a non-user contacting portion, and wherein the lower perimeter has a left lower shoulder proximate a left-side transition between the user contacting portion and the non-user contacting portion and a right lower shoulder proximate a right-side transition between the user contacting portion and the non-user contacting portion, and wherein at least portions of the non-user contacting portion of the upper perimeter and the non-user contacting portion of the lower perimeter are attached; a head strap assembly comprising a first head strap having first and second end portions and a second head strap having first and second end portions, and wherein the first end portions of the first and second head straps are attached to the left upper and lower shoulders in a side-by-side configuration between the upper and lower mask substrates, the second end portions of the first and second head straps are attached to the right upper and lower shoulders in a side-by-side configuration between the upper and lower mask substrates; and wherein each of the first and second head straps have a a stretch along their length of at least 150% of their unstretched length and, when stretched to this stretched length, recover more than seventy-five percent of the stretched length when the stretch tension is removed.

Embodiment 2. The pouch-style mask of embodiment 1, wherein each of the first end portions of the first and second head straps and second end portions of the first and second head straps have a width of between 0.25 to 1.5 inches, 0.25 to 1 inch, 0.5 to 1.5 inches, 0.5 to 1.25 inches, or 0.75 to 1.25 inches.

Embodiment 3. The pouch-style mask of embodiment 2, wherein each of the left upper and lower shoulders and right upper and lower shoulders has a width within twenty-five, twenty, fifteen, ten five percent of or the same as a combined width of the first end portions of the first and second head straps.

Embodiment 4. The pouch-style mask of any preceding embodiment, wherein the upper mask substrate comprises a third layer comprising spunbond material.

Embodiment 5. The pouch-style mask of embodiment 4, wherein, for the upper mask substrate, the second layer is between the first layer and the third layer.

Embodiment 6. The pouch-style mask of embodiment 5, wherein the lower mask substrate comprises a third layer comprising spunbond.

Embodiment 7. The pouch-style mask of embodiment 6, wherein, for the lower mask substrate, the second layer is between the first layer and the third layer.

Embodiment 8. The pouch-style mask of any of the preceding embodiments, wherein, for at least one of the upper and lower mask substrates, the first layer comprises spunbond/meltblown/spunbond laminate.

Embodiment 9. The pouch-style mask of any preceding embodiment comprising a nosepiece comprising metallic wires.

Embodiment 10. The pouch-style mask of embodiment 9, wherein the nosepiece is attached to an exterior of the first layer of the upper mask substrate and wherein the exterior of the first layer of the upper mask substrate is externally facing.

Embodiment 11. The pouch-style mask of embodiment 9, wherein the nosepiece is attached between the first and second layers of the upper mask substrate.

Embodiment 12. The pouch-style mask of any preceding embodiment, wherein the mask blocks 95 percent of 0.3-micron particles.

Embodiment 13. A pouch-style mask comprising a upper mask substrate comprising a first layer comprising spunbond material and a second layer comprising meltblown material and having an upper perimeter comprising a user contacting portion and a non-user contacting portion, and wherein the upper perimeter has a left upper shoulder proximate a left-side transition between the user contacting portion and the non-user contacting portion and a right upper shoulder proximate a right-side transition between the user contacting portion and the non-user contacting portion; a lower mask substrate comprising a first layer comprising spunbond material and a second layer comprising meltblown material and having a lower perimeter comprising a user contacting portion and a non-user contacting portion, and wherein the lower perimeter has a left lower shoulder proximate a left-side transition between the user contacting portion and the non-user contacting portion and a right lower shoulder proximate a right-side transition between the user contacting portion and the non-user contacting portion, and wherein at least portions of the non-user contacting portion of the upper perimeter and the non-user contacting portion of the lower perimeter are attached; a head strap assembly comprising a first head strap having first and second end portions and a second head strap having first and second end portions, and wherein the first end portions of the first and second head straps are attached to the left upper and lower shoulders in a side-by-side configuration between the upper and lower mask substrates, the second end portions of the first and second head straps are attached to the right upper and lower shoulders in a side-by-side configuration between the upper and lower mask substrates, and wherein each of the first end portions of the first and second head straps and second end portions of the first and second head straps have a width of between 0.4 inches and 1 inch.

Embodiment 14. The pouch-style mask of embodiment 13, wherein each of the first and second head straps have a have a stretch along their length of at least 150% of their unstretched length and, when stretched to this stretched length, recover more than seventy-five percent of the stretched length when the stretch tension is removed.

Embodiment 15. The pouch-style mask of embodiments 13 or 14, wherein at least one of the upper and lower mask substrates comprises a third layer comprising spunbond material.

Embodiment 16. The pouch-style mask of embodiment 15, wherein the second layer is between the first layer and the third layer.

Embodiment 17. The pouch-style mask of embodiment 13 comprising a nosepiece adhered to an exterior of the first layer of the upper mask substrate.

Embodiment 18. The pouch-style mask of embodiment 13, wherein each of the left upper and lower shoulders and right upper and lower shoulders have a perimeter section, orthogonal to the respective user contacting portions, having a length of between 0.3 and 0.8 inches Embodiment 19. The pouch-style mask of embodiment 13, wherein the at least portions of the non-user contacting portion of the upper perimeter and the non-user contacting portion of the lower perimeter are attached through ultrasonic welding.

Embodiment 20. The pouch-style mask of embodiment 13, where the meltblown material of the second layer of the upper mask substrate has a basis weight of about 35 to 45 gsm.

Embodiment 21. The pouch-style mask of embodiment 13, where the spunbond material of the first layer of the upper mask substrate has a basis weight of about 22 to 32 gsm.

As various changes could be made in the above products without departing from the scope of the disclosure, it is intended that all matter contained in the above description and shown in the accompanying drawings shall be interpreted as illustrative and not in a limiting sense.

What is claimed is:

1. A pouch-style mask comprising:

a upper mask substrate comprising a first layer comprising spunbond material and a second layer comprising meltblown material and having an upper perimeter comprising a user contacting portion and a non-user contacting portion, and wherein the upper perimeter has a left upper shoulder proximate a left-side transition between the user contacting portion and the non-user contacting portion and a right upper shoulder proximate a right-side transition between the user contacting portion and the non-user contacting portion;

a lower mask substrate comprising a first layer comprising spunbond material and a second layer comprising meltblown material and having a lower perimeter comprising a user contacting portion and a non-user contacting portion, and wherein the lower perimeter has a left lower shoulder proximate a left-side transition between the user contacting portion and the non-user contacting portion and a right lower shoulder proximate a right-side transition between the user contacting portion and the non-user contacting portion, and wherein at least portions of the non-user contacting portion of the upper perimeter and the non-user contacting portion of the lower perimeter are attached;

a head strap assembly comprising a first head strap having first and second end portions and a second head strap, separate from the first head strap, having first and second end portions, and wherein the first end portions of the first and second head straps are attached to the left upper and lower shoulders in a side-by-side configuration between the upper and lower mask substrates, the second end portions of the first and second head straps are attached to the right upper and lower shoulders in a side-by-side configuration between the upper and lower mask substrates, and, in the storage configuration, the first head strap and the second head strap are parallel in a same plane, but spaced apart from each other, with the second head strap closest to the non-user contacting portion, and wherein each of the first head strap and the second head strap is at least 0.5 inches wide; and wherein at least one of the first and second head straps have a stretch along their length of at least 150% of their unstretched length and, when stretched to this stretched length, recover more than seventy-five percent of the stretched length when the stretch tension is removed.

* * * * *